United States Patent
McCleery

(10) Patent No.: US 12,162,234 B2
(45) Date of Patent: Dec. 10, 2024

(54) TRANSFER RING SHOE AND TRANSFER RING WITH REDUCED AIR ENTRAPMENT FEATURES

(71) Applicant: Davian Enterprises, LLC, Greenback, TN (US)

(72) Inventor: Kenneth McCleery, Loudon, TN (US)

(73) Assignee: Davian Enterprises, LLC, Greenback, TN (US)

( * ) Notice: Subject to any disclaimer, the term of this patent is extended or adjusted under 35 U.S.C. 154(b) by 500 days.

(21) Appl. No.: 17/335,703

(22) Filed: Jun. 1, 2021

(65) Prior Publication Data
US 2021/0370628 A1    Dec. 2, 2021

Related U.S. Application Data

(60) Provisional application No. 63/032,176, filed on May 29, 2020.

(51) Int. Cl.
*B29D 30/26* (2006.01)
*B29D 30/24* (2006.01)

(52) U.S. Cl.
CPC ....... *B29D 30/2607* (2013.01); *B29D 30/242* (2013.01); *B29D 30/26* (2013.01); *B29D 2030/2657* (2013.01)

(58) Field of Classification Search
CPC .......... B29D 30/0016; B29D 30/005; B29D 30/242; B29D 30/26; B29D 30/2607;
(Continued)

(56) References Cited

U.S. PATENT DOCUMENTS

| 1,233,567 A | 7/1917 | William |
| 1,750,728 A | 3/1930 | Robison |

(Continued)

FOREIGN PATENT DOCUMENTS

| CA | 2142004 A1 | 8/1995 |
| CA | 2188639 A1 | 4/1997 |

(Continued)

OTHER PUBLICATIONS

Nishimoto K, WO-2011118166-A1, machine translation. (Year: 2011).*

(Continued)

*Primary Examiner* — Sedef E Paquette
(74) *Attorney, Agent, or Firm* — Blanchard Horton PLLC

(57) ABSTRACT

A transfer ring for use in the manufacture of tires comprises a radially expandable and collapsible segmented gripping surface defined by a plurality of shoes, each shoe having an inwardly-facing surface mounted for movement toward and away from a central axis of the cylindrical gripping surface. Each inwardly-facing surface has first and second side edges. Each side edge has a central portion configured to be substantially parallel to a central portion of the other side edge and forms a mid-portion therebetween. Each side edge has first and second tapered portions on opposite respective ends of the central portion. Each tapered portion extends toward a tapered portion of the other side edge. The tapered portions cooperate to form a end portions that decrease in width away from the mid-portion.

20 Claims, 5 Drawing Sheets

(58) Field of Classification Search
CPC .............................. B29D 30/54; B29D 30/58;
B29D 2030/0022; B29D 2030/0027;
B29D 2030/0033; B29D 2030/0038;
B29D 2030/0044; B29D 2030/241; B29D
2030/265; B29D 2030/2657
USPC ............. 156/111, 396, 406.2, 415, 417, 420,
156/421.6
See application file for complete search history.

(56) References Cited

U.S. PATENT DOCUMENTS

| | | |
|---|---|---|
| 2,073,729 A | 3/1937 | Bostwick |
| 2,168,897 A | 8/1939 | Bostwick |
| 2,201,469 A | 5/1940 | Bostwick |
| RE22,369 E | 8/1943 | Bostwick |
| 2,335,169 A | 11/1943 | Bostwick |
| 2,353,767 A | 7/1944 | Schnedarek |
| 2,367,831 A | 1/1945 | Manson |
| 2,529,861 A | 11/1950 | Angell et al. |
| 2,614,057 A | 10/1952 | Ericson et al. |
| 2,687,160 A * | 8/1954 | Norton .................... B60C 27/20 264/129 |
| 2,699,198 A | 1/1955 | Balzhiser |
| 2,715,932 A | 8/1955 | Frazier |
| 2,728,616 A | 12/1955 | Potter |
| 3,077,918 A | 2/1963 | John |
| 3,101,289 A | 8/1963 | Dario et al. |
| 3,111,444 A | 11/1963 | Jacques |
| 3,111,445 A | 11/1963 | Jacques et al. |
| 3,140,216 A | 7/1964 | Shilts et al. |
| 3,207,648 A | 9/1965 | Shilts |
| 3,346,434 A | 10/1967 | Fulton |
| 3,366,526 A | 1/1968 | Winslow |
| 3,375,154 A | 3/1968 | Ruttenberg et al. |
| 3,405,023 A | 10/1968 | Eckenwiler et al. |
| 3,408,244 A | 10/1968 | Frazier |
| 3,485,700 A | 12/1969 | Cooper et al. |
| 3,489,634 A | 1/1970 | Pizzo et al. |
| 3,507,528 A | 4/1970 | Desmarchais |
| 3,547,733 A | 12/1970 | Leblond |
| 3,598,673 A | 8/1971 | Renato |
| 3,607,558 A | 9/1971 | Nebout |
| 3,616,059 A | 10/1971 | Frazier |
| 3,644,162 A | 2/1972 | Appleby et al. |
| 3,676,261 A | 7/1972 | Appleby et al. |
| 3,694,290 A | 9/1972 | Pacciarini et al. |
| 3,695,974 A | 10/1972 | Henley |
| 3,784,426 A | 1/1974 | Woodhall et al. |
| 3,787,262 A | 1/1974 | Appleby et al. |
| 3,816,218 A | 6/1974 | Felten |
| 3,833,444 A | 9/1974 | Mallory |
| 3,837,968 A | 9/1974 | Marra |
| 3,867,229 A | 2/1975 | Marra |
| 3,873,398 A | 3/1975 | Yokoo et al. |
| 3,887,423 A | 6/1975 | Gazuit |
| 3,929,546 A | 12/1975 | Katagiri et al. |
| 3,932,256 A | 1/1976 | Touchette |
| 3,948,717 A | 4/1976 | Suzuki et al. |
| 4,010,058 A | 3/1977 | Kubinski et al. |
| 4,105,487 A | 8/1978 | Suzuki et al. |
| 4,126,507 A | 11/1978 | Kim et al. |
| 4,128,450 A | 12/1978 | Cantarutti |
| 4,131,500 A | 12/1978 | Wilde et al. |
| 4,149,927 A | 4/1979 | Lauer, Jr. |
| 4,151,035 A | 4/1979 | Jellison |
| 4,155,796 A | 5/1979 | Rambacher |
| 4,190,482 A | 2/1980 | Yabe |
| 4,210,482 A | 7/1980 | Collins |
| 4,220,494 A | 9/1980 | Kawaida et al. |
| 4,230,517 A | 10/1980 | Enders |
| 4,239,579 A | 12/1980 | Felten et al. |
| 4,292,112 A | 9/1981 | Kumagai |
| 4,312,696 A | 1/1982 | Bryant |
| 4,324,604 A | 4/1982 | Alexander et al. |
| 4,325,764 A | 4/1982 | Appleby et al. |
| 4,392,899 A | 7/1983 | Bertoldo |
| 4,425,180 A | 1/1984 | Samokhvalov et al. |
| 4,436,574 A | 3/1984 | Long et al. |
| 4,445,962 A | 5/1984 | Felder |
| 4,469,546 A | 9/1984 | Klose et al. |
| 4,472,233 A | 9/1984 | Fukamachi et al. |
| 4,473,427 A | 9/1984 | Irie |
| 4,510,012 A | 4/1985 | Kawaida et al. |
| 4,519,279 A | 5/1985 | Ruggeri |
| 4,521,269 A | 6/1985 | Ozawa |
| 4,547,251 A | 10/1985 | Landsness |
| 4,582,557 A | 4/1986 | Enders |
| 4,626,302 A | 12/1986 | Casey et al. |
| 4,636,277 A | 1/1987 | Owen et al. |
| 4,729,541 A | 3/1988 | Maier |
| 4,780,171 A | 10/1988 | Byerley |
| 4,798,647 A | 1/1989 | Haas |
| 4,861,123 A | 8/1989 | Russell |
| 4,861,173 A | 8/1989 | Kemp |
| 5,047,108 A | 9/1991 | Byerley |
| 5,066,354 A | 11/1991 | Benjamin |
| 5,071,498 A | 12/1991 | Nishiide et al. |
| 5,078,819 A | 1/1992 | Sergel et al. |
| 5,089,077 A | 2/1992 | Byerley |
| 5,203,947 A | 4/1993 | Boeker |
| 5,223,074 A | 6/1993 | Miyanaga et al. |
| 5,225,028 A | 7/1993 | Bierens |
| 5,232,542 A | 8/1993 | Norjiri et al. |
| 5,264,068 A | 11/1993 | Masuda |
| 5,320,701 A | 6/1994 | Jellison et al. |
| 5,354,405 A | 10/1994 | Byerley |
| 5,380,384 A | 1/1995 | Tokunaga et al. |
| 5,441,587 A | 8/1995 | Byerley |
| 5,500,074 A | 3/1996 | Suzuki |
| 5,505,803 A | 4/1996 | Byerley |
| 5,558,733 A | 9/1996 | Byerley |
| 5,618,374 A | 4/1997 | Byerley |
| 5,634,745 A | 6/1997 | Wiman et al. |
| 5,635,016 A | 6/1997 | Byerley |
| 5,650,034 A | 7/1997 | Siegenthaler |
| 5,709,768 A | 1/1998 | Byerley |
| 5,735,995 A | 4/1998 | Bull et al. |
| 5,755,922 A | 5/1998 | Baldoni et al. |
| 5,766,408 A | 6/1998 | Ogawa |
| 6,004,250 A | 12/1999 | Byerley |
| 6,007,268 A | 12/1999 | Whittington et al. |
| 6,013,147 A | 1/2000 | Byerley |
| 6,058,999 A | 5/2000 | Roberts et al. |
| 6,117,269 A | 9/2000 | Pizzorno |
| 6,152,645 A | 11/2000 | Sanford |
| 6,238,292 B1 | 5/2001 | Pelkey |
| 6,336,485 B1 | 1/2002 | Kaneko et al. |
| 6,390,166 B1 | 5/2002 | Roberts et al. |
| 6,457,505 B1 | 10/2002 | Byerley |
| 6,475,319 B1 | 11/2002 | Akiyama |
| 6,539,998 B2 | 4/2003 | Sergel et al. |
| 6,571,682 B2 | 6/2003 | Roberts et al. |
| 6,585,022 B1 | 7/2003 | Rex |
| 6,602,372 B1 | 8/2003 | Byerley |
| 6,673,183 B2 | 1/2004 | Byerley |
| 6,793,752 B2 | 9/2004 | Lemaire et al. |
| 7,000,905 B1 | 2/2006 | Lutter et al. |
| 7,287,772 B2 | 10/2007 | James |
| 7,288,160 B2 | 10/2007 | Roedseth et al. |
| 7,370,897 B2 | 5/2008 | Fukazawa |
| 7,637,665 B2 | 12/2009 | Cook |
| 7,699,952 B2 | 4/2010 | Linne et al. |
| 7,837,816 B2 | 11/2010 | Linne et al. |
| 8,056,597 B2 | 11/2011 | Byerley |
| 8,091,602 B2 | 1/2012 | Roberts et al. |
| 8,272,417 B2 | 9/2012 | Painter |
| 8,555,944 B2 | 10/2013 | Painter |
| 8,602,078 B2 | 12/2013 | Byerley |
| 8,701,731 B2 | 4/2014 | Roberts et al. |
| 9,044,908 B2 | 6/2015 | Babin |
| 9,427,925 B2 | 8/2016 | Araki |
| 10,189,221 B2 | 1/2019 | Jones et al. |
| 11,993,043 B2 | 5/2024 | Hassell et al. |

(56) References Cited

U.S. PATENT DOCUMENTS

| | | |
|---|---|---|
| 2003/0056874 A1 | 3/2003 | Durand |
| 2003/0168144 A1 | 9/2003 | Weaver et al. |
| 2003/0197389 A1 | 10/2003 | Moilanen et al. |
| 2004/0239134 A1 | 12/2004 | Fukazawa |
| 2006/0000554 A1 | 1/2006 | Kitz et al. |
| 2008/0202690 A1 | 8/2008 | Painter |
| 2009/0151873 A1 | 6/2009 | Pinto et al. |
| 2010/0000658 A1 | 1/2010 | Roberts et al. |
| 2010/0101732 A1 | 4/2010 | Howley et al. |
| 2010/0186864 A1 | 7/2010 | Koopman et al. |
| 2011/0303366 A1 | 12/2011 | Byerley |
| 2012/0017720 A1 | 1/2012 | Painter |
| 2012/0033906 A1 | 2/2012 | Painter |
| 2012/0037318 A1* | 2/2012 | Byerley ............ B29D 30/2607 156/421.6 |
| 2012/0090787 A1 | 4/2012 | Jones et al. |
| 2012/0168087 A1 | 7/2012 | Byerley |
| 2012/0222822 A1 | 9/2012 | Jones et al. |
| 2012/0256434 A1 | 10/2012 | Roberts et al. |
| 2013/0008611 A1 | 1/2013 | Marcus et al. |
| 2013/0168023 A1 | 7/2013 | Babin |
| 2014/0048212 A1 | 2/2014 | Weaver et al. |
| 2014/0116601 A1 | 5/2014 | Bormann |
| 2014/0213330 A1 | 7/2014 | Oh |
| 2014/0216660 A1* | 8/2014 | Jones ................. B29D 30/2607 156/406.2 |
| 2014/0360673 A1 | 12/2014 | Marcus, Jr. |
| 2015/0028147 A1 | 1/2015 | Rich |
| 2015/0239190 A1 | 8/2015 | Currie et al. |
| 2016/0159023 A1 | 6/2016 | Delorme et al. |
| 2016/0176138 A1 | 6/2016 | Guzman |
| 2020/0101682 A1 | 4/2020 | Hassell et al. |
| 2020/0238647 A1 | 7/2020 | Mccleery |

FOREIGN PATENT DOCUMENTS

| | | |
|---|---|---|
| CA | 2219387 A1 | 4/1998 |
| DE | 2705504 A1 | 8/1978 |
| DE | 19913241 C1 | 9/2000 |
| DE | 102009025759 A1 | 11/2010 |
| EP | 1621327 A1 | 2/2006 |
| EP | 1688240 A1 | 8/2006 |
| EP | 2155481 A1 | 2/2010 |
| EP | 2504159 A1 | 10/2012 |
| GB | 2323573 A | 9/1998 |
| GB | 2610770 B | 3/2024 |
| JP | 58179633 A | 10/1983 |
| JP | S60196330 A | 10/1985 |
| JP | 2007136935 A | 6/2007 |
| JP | 2008221750 A | 9/2008 |
| JP | 2009274392 A | 11/2009 |
| JP | 2011255768 A | 12/2011 |
| JP | 2013018274 A | 1/2013 |
| JP | 5562470 B1 | 7/2014 |
| KR | 100963503 B1 | 6/2010 |
| NL | 9401271 A | 3/1995 |
| RU | 2381899 C2 | 2/2010 |
| SU | 1106682 A1 | 8/1984 |
| WO | 2001007242 A1 | 2/2001 |
| WO | 2006003058 A1 | 1/2006 |
| WO | 2008025598 A1 | 3/2008 |
| WO | 2009058296 A1 | 5/2009 |
| WO | 2010052103 A1 | 5/2010 |
| WO | WO-2011118166 A1 * | 9/2011 ......... B29D 30/2607 |
| WO | 2011159343 A1 | 12/2011 |
| WO | 2012021160 A1 | 2/2012 |
| WO | 2012031193 A1 | 3/2012 |

OTHER PUBLICATIONS

"International Search Report and the written opinion received for PCT Patent Application No. PCT/US2019/053428, mailed on Jan. 17, 2020", 4 Pages.

"International Search Report nd the Written Opinion received for PCT Patent Application No. PCT/US2020/015445, mailed on May 7, 2020", 5 Pages.

Kim, Harry , "International Search Report and Written Opinion", 8 Pages.

European Patent Office , "Extended European Search Report", Rule 62 EPC, Application No. 21813552.3-1014, May 13, 2024, 6 pages.

* cited by examiner

TRANSFER RING SHOE AND TRANSFER RING WITH REDUCED AIR ENTRAPMENT FEATURES

CROSS-REFERENCE TO RELATED APPLICATIONS

This application claims the benefit of U.S. Provisional Patent Application No. 63/032,176, filed on May 29, 2020, the entirety of which is incorporated herein by reference.

BACKGROUND OF THE INVENTION

1. Field of Invention

The present general inventive concept relates to devices that are useful in the manufacture of vehicle tires. More particularly, the present general inventive concept relates to a transfer ring and transfer ring shoe having features designed to reduce air entrapment within a tire during manufacture of the tire.

2. Description of the Related Art

The manufacture of a vehicle tire commonly includes the steps of forming a tire carcass, forming a toroid-shaped belt and tread "package" of the tire separately from the carcass, and thereafter marrying the belt and tread package to the tire carcass to form a "green" tire. The green tire is thereafter treated to form the tread and various other features of a finished tire. Other supplementary steps, such as bonding the belt and tread package to the tire carcass, often referred to as "stitching" the belt and tread package, may be performed during the course of, or following, one or more of the aforementioned steps.

Formation of a belt and tread package of a tire is typically accomplished using a belt and tread drum, of the type disclosed in U.S. Pat. No. 6,013,147. Such a belt and tread drum typically defines an outer cylindrical surface, or circumference, about which one or more layers of the tire belt material (comprising, for example, reinforcement cords embedded in a polymeric binder) are laid to define the belt and tread package. The circumference of the belt and tread drum is preferably capable of expanding and contracting to allow, for example, removal of a completed belt and tread package from the drum. A completed belt and tread package is typically essentially non-expandable radially. However, a completed belt and tread package is typically flexible to the extent that, when unsupported, the toroid-shaped belt and tread package will deform and sag under the influence of gravity. Also, desirably, the adjustable circumference of the belt and tread drum enables a single drum to be used to form belt and tread packages of alternative diameters.

In the manufacture of vehicle tires, a tire carcass is typically fabricated using a tire building drum of the type described in U.S. Pat. No. 6,457,505. Such a tire building drum typically defines a radially expandable and contractible cylindrical working surface, similar to the above-discussed belt and tread drum, upon which a tire carcass is formed. Subsequent to the formation of the tire carcass on the cylindrical working surface, such tire carcass typically is transferred to an expansion drum of the type discussed in U.S. Pat. No. 6,602,372. The tire carcass is positioned surrounding the expansion drum, and a portion of the tire carcass is overlaid with the belt and tread package. The tire carcass is then inflated to a toroid shape resembling, though often not identical to, the shape of a finished tire. While the tire carcass is inflated, the belt and tread package is "stitched" to the tire carcass.

In modern tire manufacture, the process of stitching a belt and tread package to a tire carcass is typically accomplished using a "stitching" machine of the type disclosed in U.S. Pat. No. 3,423,272. Such a stitching machine typically defines one or more rollers which are configured to be brought in proximity to a rotatable expansion drum when a tire carcass is positioned surrounding the expansion drum, the portion of the tire carcass is overlaid with the belt and tread package, and the tire carcass is inflated to the toroid shape. As the expansion drum is rotated, the rollers of the stitching machine are used to press against a circumferential outer surface of the belt and tread package, thereby pressing the belt and tread package into the tire carcass and adhering the contacting surfaces of the two components to one another. Alternatively, or in conjunction with a stitching machine, a belt and tread package may be "hand stitched" to a tire carcass using hand-held rollers or similar tools. In either case, the rollers are typically applied to the outer surface of the belt and tread package beginning along an axially central circumferential path along the belt and tread package and proceeding in a spiral shape circumferentially about the belt and tread package and axially-outwardly therefrom toward one of opposite circumferential edges of the belt and tread package. In this way, any air gaps or voids which may be present between the belt and tread package and the tire carcass are squeezed axially-outwardly toward the outer circumferential edges of the belt and tread package.

In the above-described process, the steps of transferring a tire carcass from a tire building drum to an expansion drum and transferring a belt and tread package to a tire carcass for stitching are typically both accomplished using one or more transfer rings of the type described in U.S. Pat. No. 8,091,602. Such a transfer ring, which may also be referred to as an "O-ring," typically includes a plurality of "shoe" segments having arced interior surfaces which collectively form a segmented, radially-inwardly-facing, and generally cylindrical surface suitable for grasping and holding a tire carcass and/or a belt and tread package. Each shoe segment is mounted on an appropriate linkage such that the shoes are collectively radially expandable and contractible with respect to one another, such that the diameter of the segmented, radially-inwardly-facing cylindrical surface can be expanded to fit over a tire carcass and/or belt and tread package, contracted to grasp the tire carcass or belt and tread package for transfer, and then re-expanded to release the tire carcass or belt and tread package following transfer.

The arced interior surfaces of the shoes are generally referred to herein as forming a segmented "cylindrical" surface. However, it will be understood that the arcuate inwardly facing surfaces of the shoes may be formed with additional curvature in order to accommodate a more desirable fit along respective portions of the exterior of the tire component. For example, in certain designs of transfer rings, each inward surface of each shoe forming the segmented "cylindrical" surface defines a gradually changing radius in a direction along the axial dimension of the segment. In other words, in the axial direction of the cylindrical surface, a central portion of the shoe may define a concave or convex shape, and the contact surface may have a gradual radius outward to the edges/sides of the shoe. Likewise, the curvature of each shoe interior surface along a circumferential dimension may vary between central portions and circumferential side edges of the shoe. Thus, while not defining a perfect cylindrical shape, it is understood that the arcuate surfaces of the shoes may form a generally "cylindrical" gripping surface.

Furthermore, in prior art designs of transfer rings, the arced interior surfaces of transfer ring shoes may generally be referred to herein as having a "rectangular" shape. While the arcuate inwardly-facing surfaces of the shoes may be formed with the above-described circumferentially and/or axially arcuate surfaces, the term "rectangular" may be used herein to denote a transfer ring shoe having an interior surface defining circumferential end edges extending parallel to the central axis of the generally cylindrical segmented surface, i.e., orthogonal to the arcuate axial side edges of the shoe. Thus, when each shoe is observed in plan view, the arcuate inwardly-facing surface of the shoe may resemble a curved rectangular shape. Similarly, while the shoes of a transfer ring are typically described herein as having "radial" movement toward and away from a central axis of the transfer ring, it is understood that various transfer ring designs may provide motion that is not purely radial, such as, for example, "iris" movement along both radial and circumferential directions of the transfer ring.

When a transfer ring is used as described above to transfer a tire carcass and/or belt and tread package (as used herein, collectively, a "tire component,"), it is not uncommon for the transfer ring to be configured such that the shoes apply considerable pressure to exterior surfaces of the tire component, in part to assist in maintaining a uniform toroid shape of the tire component during transfer. Such high pressures applied to the exterior surfaces of the tire component can result in at least a portion of the arced interior surfaces of the shoes becoming imprinted in the tire component, resulting in the formation of imprints of the interior surfaces of the shoes, and corresponding bulges adjacent the imprints, in the tire component. However, in situations where space is left between adjacently oriented rectangular transfer ring shoes, impressions may be made in the tire components by the shoes which leave uncompressed areas (e.g., seams) between the shoes. When the tire components are stitched together, these rectangular impressions, and the resulting abrupt edge of the seam formed in the tire component, causes air to be evacuated at 90 degrees to the circumferential edge of the belt and tread package. Thus, these uncompressed seam areas in the tire components may not pass air as freely toward the edges of the belt and tread package. In some extreme cases, the presence of these uncompressed seam areas in the tire component may sometimes even trap air voids or gaps between the surfaces of the stitched tire components after the actions of the stitcher machine and/or hand stitcher tools are completed. These air voids or gaps can, in certain circumstances, result in undesirable performance features of the finished tire, such as for example vibration and/or resonance of the rolling tire. Such vibration and/or resonance can result in undesirable noise and/or shaking of the tire, increased wear and shortened life of the tire, and in some extreme instances, catastrophic failure of the tire. These air entrapment issues may be especially problematic, for example, in applications in which the tire components are thin and the materials are of lighter weight.

In view of the above, it could be beneficial to provide a transfer ring incorporating a transfer ring shoe which reduces the air entrapment between tire components when the tire components are stitched together.

BRIEF SUMMARY

The foregoing and/or other aspects and advantages of the present general inventive concept may be achieved by providing, a transfer ring for use in a system for the manufacture of vehicle tires is provided. According to various example embodiments of the present general inventive concept, the transfer ring may comprise a radially expandable and collapsible, segmented, generally cylindrical gripping surface defined by a plurality of inwardly-facing surfaces mounted for movement toward and away from a central axis of the cylindrical gripping surface. Each inwardly-facing surface may have first and second side edges, and each side edge may have a central portion configured to be substantially parallel to a central portion of the other side edge, in which a mid-portion is formed therebetween. Each side edge may have first and second tapered portions on opposite respective ends of the central portion, and each tapered portion of each side edge may extend in a direction outward from the corresponding central portion and toward a tapered portion of the other side edge. In various example embodiments, the first tapered portions of the first and second side edges may cooperate to form a first end portion, and the second tapered portions of the first and second side edges may cooperate to form a second end portion. The first and second end portions may decrease in width in a direction away from the mid-portion.

In various example embodiments, the first and second tapered portions of each first and second side edge may extend inwardly from the respective central portion at an angle of 30 degrees. The first and second end portions may further define respective first and second end edges that are substantially parallel to one another. The first and second tapered portions of each first and second side edge may extend inwardly from the respective central portion to form curved first and second end portions. The central portion of each first and second side edge may be narrower than one of the respective first and second tapered portions. The inwardly-facing surfaces may be symmetrical about a midpoint between the first and second end portions. In various example embodiments, each inwardly-facing surface may define an arcuate shape about a circumferential dimension of the cylindrical gripping surface. In various example embodiments, each inwardly-facing surface may define an arcuate shape about an axial dimension of the cylindrical gripping surface. In various embodiments, each central portion of each first side edge of each inwardly-facing surface may be shaped to conform to and engage a central portion of a second side edge of an adjacent inwardly-facing surface at a collapsed position of the transfer ring. In various example embodiments, each first and second end edge may be narrower than each central portion of each first and second side edge.

According to various example embodiments of the present general inventive concept, a transfer ring shoe for use in a system for the manufacture of vehicle tires is provided. According to various example embodiments, the transfer ring shoe may comprise a plate defining a first surface for gripping a tire component and an opposite second surface, and a mount for securing the plate for movement toward and away from a central axis of a transfer ring. The first surface may define opposite first and second side edges extending parallel to one another, opposite first and second end edges extending parallel to one another, and a plurality of tapered edges, each tapered edge extending inwardly from, and between corresponding ends of, ones of the first and second side edges and the first and second end edges. A mid-portion of the plate between the first and second side edges may define a gripping surface for a tire component. Each end edge and corresponding adjacent tapered edges may cooperate to define a tapered end portion of the plate configured to form an air escape seam in a gripped tire component.

In various example embodiments, each tapered edge may extend at an angle of 30 degrees from a corresponding side edge. In various example embodiments, each tapered edge may extend inwardly from a respective side edge to form curved first and second end portions. In various example embodiments, each side edge may be narrower than each tapered edge. In various example embodiments, the plate may be symmetrical about a mid-point between the first and second end edges. In various example embodiments, the first surface may define an arcuate shape between the first and second side edges. In various example embodiments, the first surface may define an arcuate shape between the first and second end edges. In various example embodiments, the first side edge may be shaped to conform to the second side edge. In various example embodiments, the mount may define a portion of a hinge connection for rotatably connecting the transfer ring shoe to a driven link of a transfer ring. In various example embodiments, the mount may define a portion of a cam for maintaining the first surface of the transfer ring shoe in a cylindrical configuration with other transfer ring shoes mounted in a transfer ring.

Additional aspects and advantages of the present general inventive concept will be set forth in part in the description which follows, and, in part, will be obvious from the description, or may be learned by practice of the present general inventive concept. Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
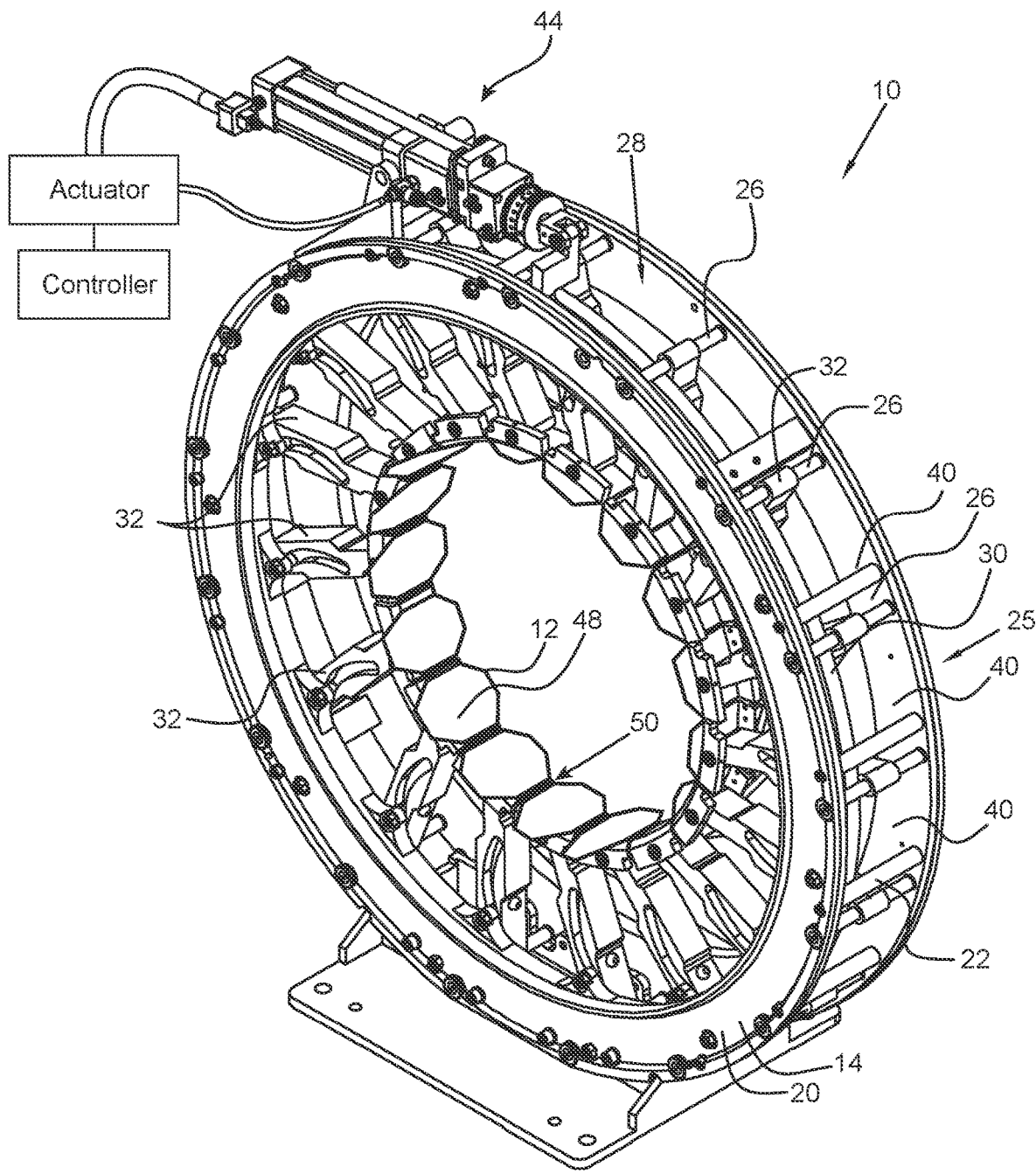
FIG. 1 illustrates a transfer ring having shoes formed in a typical "rectangular" form.
Figure 2:
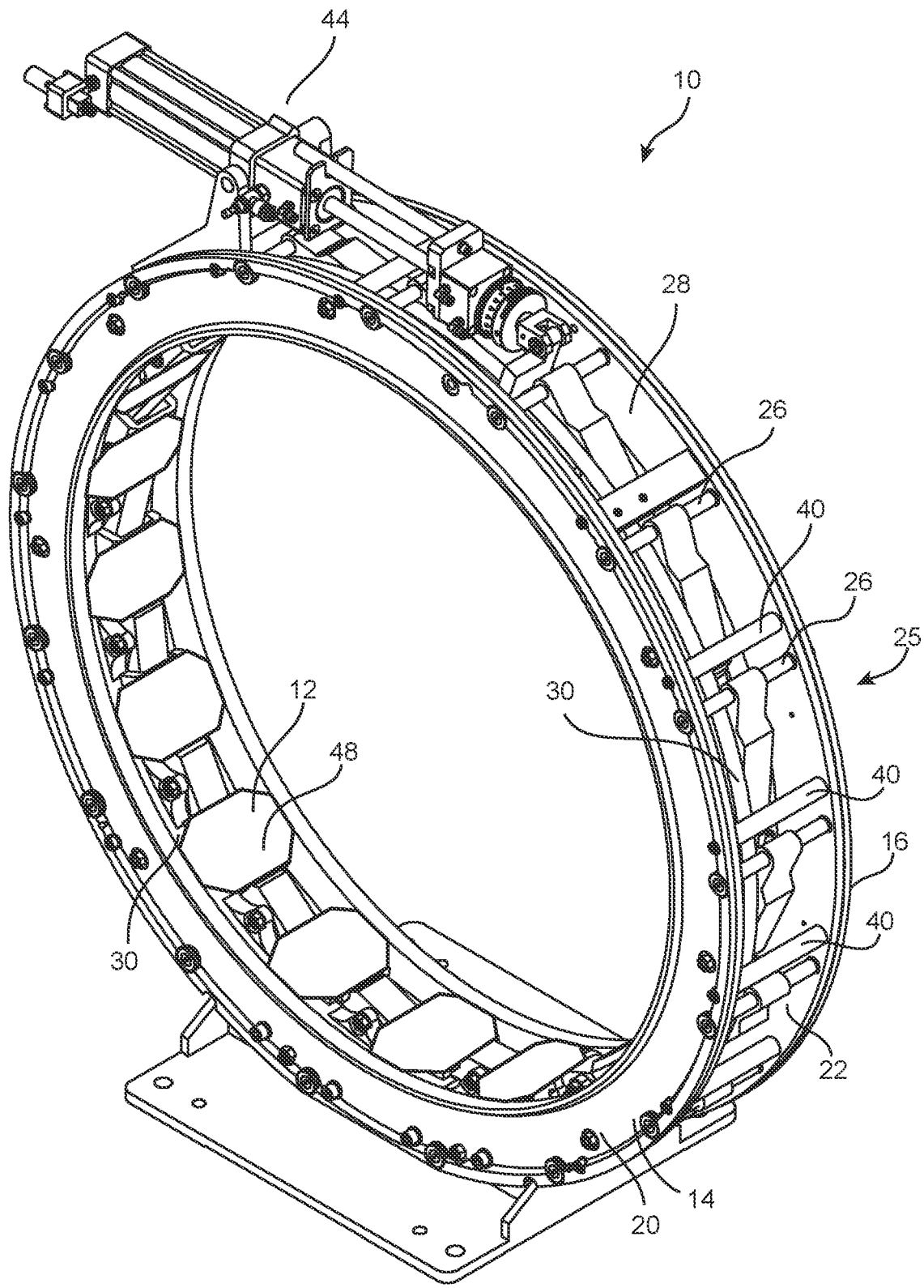
FIG. 2 illustrates a transfer ring having shoes configured according to an example embodiment of the present general inventive concept.

FIGS. 1 and 2 illustrate a transfer ring having shoes incorporating reduced air entrapment features according to an example embodiment of the present general inventive concept. The transfer ring, identified at 10 in FIGS. 1 and 2, includes first and second circular frame members 14, 16, respectively, disposed in a fixed, registered, side-by-side, parallel, and spaced apart relationship to one another. The first and second circular frame members 14, 16 are of substantially the same inner and outer diameters, and each is preferably of a generally rectangular cross-section having respective inner and outer opposite flat side surfaces. Two of these surfaces 20 and 22 are shown in FIG. 1. A plurality of hinge pin connectors 26 extend between the first and second circular frame members 14, 16 at spaced apart locations about the respective perimetral margins of the first and second circular frame members 14, 16 to rigidly retain the side-by-side, parallel, registered, and spaced apart relationship of the first and second circular frame members 14, 16, thereby defining a skeletal cage 25 having an open space 28 between the first and second circular frame members 14, 16.

Within the open space 28 of the skeletal cage 25, there is disposed a circular drive member 30 mounted in side-by-side, parallel, and coaxial relationship to the first and second circular frame members 14, 16, via a plurality of rollers 40 extending between the first and second circular frame members 14, 16, such that the drive member 30 is rotatable about a central axis of the drive member 30 with respect to the skeletal cage 25. A plurality of driven links 32 are also provided within the open space 28 of the skeletal cage 25. Each driven link 32 is of an elongated geometry, having a first end which is hingedly mounted on a respective hinge pin connector 26 extending between the first and second circular frame members 14, 16, and a second end which extends generally inwardly of the skeletal cage 25.

A power source 44, such as the piston/cylinder device illustrated in FIG. 1, is provided for effecting controlled rotation of the drive member 30 in relation to the skeletal cage 25. Thus, actuation of the power source 44 results in rotational movement of the drive member 30 in relation to the skeletal cage 25, thereby rotating each driven link 32 about its respective hinge pin connector 26 between the contracted position shown in FIG. 1, in which each second end of each driven link 32 extends generally radially inwardly toward a central axis of the drive member 30 and the first and second circular frame members 14, 16, and the expanded position shown in FIG. 2 in which each second end of each driven link 32 extends generally along a circumference of the drive member 30. It is noted that the system illustrated in FIGS. 1 and 2 is simply one type of transfer ring system that may employ the shoes of the present general inventive concept. For example, while the system of FIGS. 1 and 2 employs various linkages to move the shoes in a radial direction, other systems utilizing the present general inventive concept may have different linkages, or that move the shoes in a generally radial direction without linkages. For example, some transfer rings employing the present general inventive concept may have an array of actuators moving the shoes in a generally radial direction, other generally radially shoe moving components, and so on.

Figure 3:
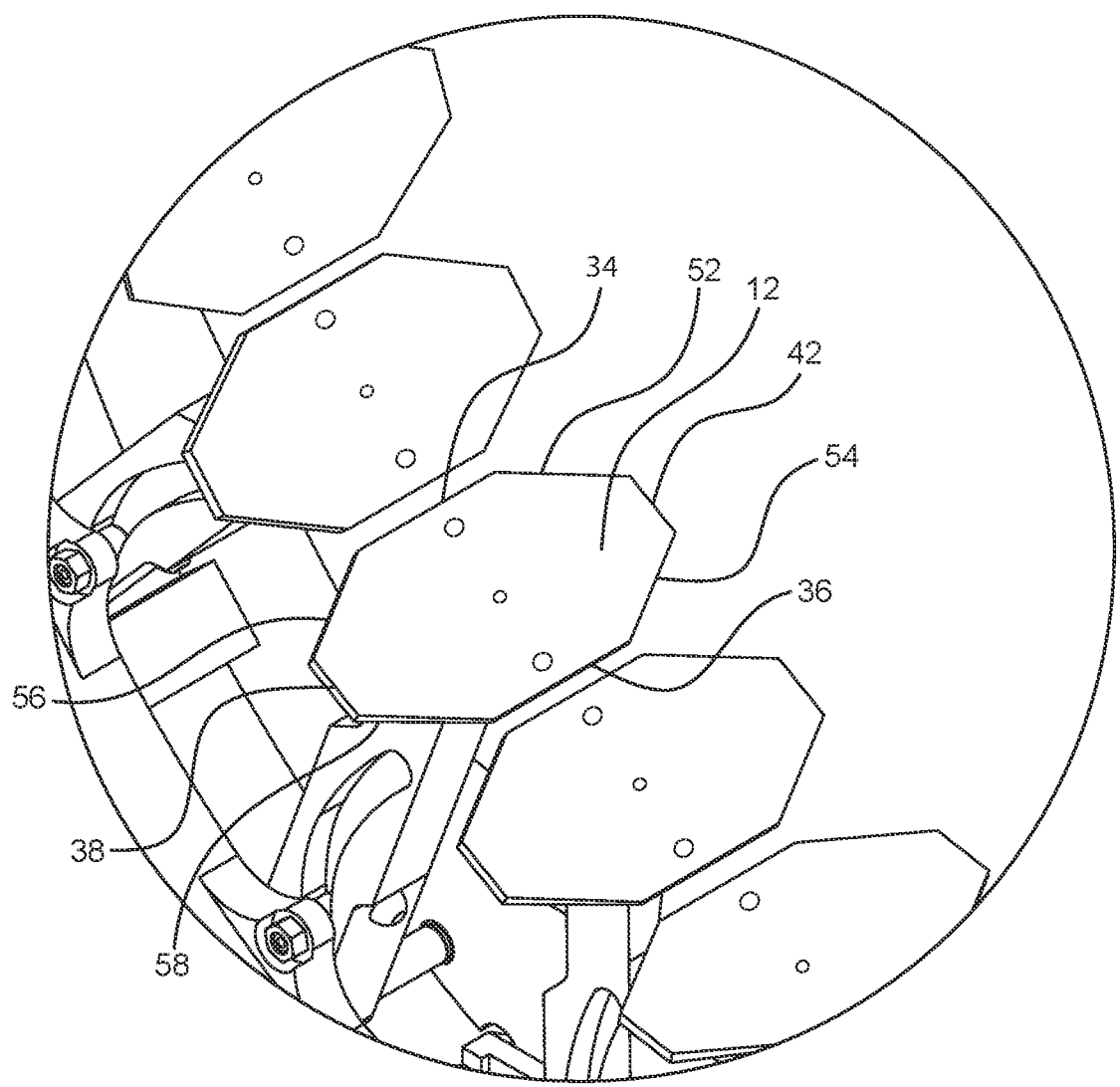
FIGS. 3-4 illustrate perspective views of the transfer ring shoe of FIG. 2.

With further reference to FIGS. 1 and 2, and additional reference to FIG. 3, the transfer ring 10 includes a plurality of shoes 12, each of which defines an arcuate inner surface 48 to form a segmented cylindrical surface 50 for grabbing and transferring tire components. As illustrated in FIG. 3, in this embodiment, the inner surface 48 of each of the plurality of shoes 12 define an octagonal, truncated rhombus shape, which may be described as an "eight-sided diamond" shape, in which each gap between adjacent shoes is constant along an "axially central portion" of the shoe and widens at an area near the axial edges of the cylindrical surface 50. The shoe 12 of this example embodiment has an inner surface 48 with first and second side edges 34, 36 that are configured to extend parallel to one another along an axial dimension of the transfer ring 10, parallel to a central axis of the segmented cylindrical surface 50. The first and second side edges 34, 36 extend only partially along an axial length of the inner surface 48, along a central portion thereof, such that the area of the inner surface 48 between these parallel first and second side edges 34, 36 may be referred to herein as the "axially central portion" 37 of the shoe 12. Likewise, the inner surface 48 defines first and second end edges 38, 42 that are configured to extend parallel to one another along opposite circumferential edges of the segmented cylindrical surface 50, in a direction parallel to a circumference of the segmented cylindrical surface 50 and along a plane normal to the central axis of the segmented cylindrical surface 50. These first and second side edges 38, 42 extend only partially along the portion of the segmented cylindrical surface 50 formed by the inner surface 48 of the respective shoe 12, along a central portion thereof, such that the area of the inner surface 48 between these parallel first and second side edges 38, 42 may be referred to herein as the "circumferentially central portion" 46 of the shoe 12.

Figure 5:
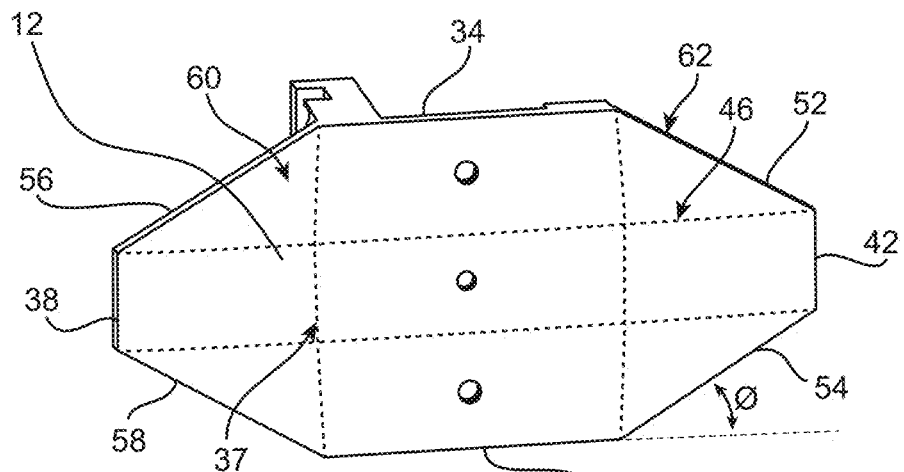
FIG. 5 illustrates a perspective view of a transfer ring according to another example embodiment of the present general inventive concept.

Extending from each endpoint of each first and second side edge 34, 36 to a proximal endpoint of an adjacent first or second end edge 38, 42 is a tapered edge 52, 54, 56, 58. For example, in the illustrated embodiment of FIG. 5, a first tapered edge 52 extends between respective proximal endpoints of the first side edge 34 and the second end edge 42. A second tapered edge 54 extends between respective proximal endpoints of the second end edge 42 and the second side edge 36. A third tapered edge 56 extends between respective proximal endpoints of the first side edge 34 and the first end edge 38. A fourth tapered edge 58 extends between respective proximal endpoints of the second side edge 36 and the first end edge 38. Each tapered edge 52, 54, 56, 58 extends generally along a direction forming an acute angle with the axial length of the inner surface 48 of the shoe 12, from the respective corresponding side edge 34, 36 toward the respective corresponding end edge 38, 42. Thus, each end edge 38, 42, together with adjacent tapered edges 52, 54, 56, 58, defines a tapered portion 60, 62 of the inner surface 48 of the shoe 12 that extends axially outwardly from a respective side of the axially central portion 37. The width of the inner surface 48 of the shoe 12, taken along a circumferential dimension of the segmented cylindrical surface 50, thus tapers in a direction axially away from the axially central portion 37 to form tapered portions 60, 62 that are increasingly narrower along an axial dimension outwardly from axially central portion 37 of the shoe 12. Thus, as illustrated in FIG. 3, gaps of increasing width are formed between adjacent shoes in the direction of the outer annular edges of the segmented cylindrical surface 50.

Figure 4:
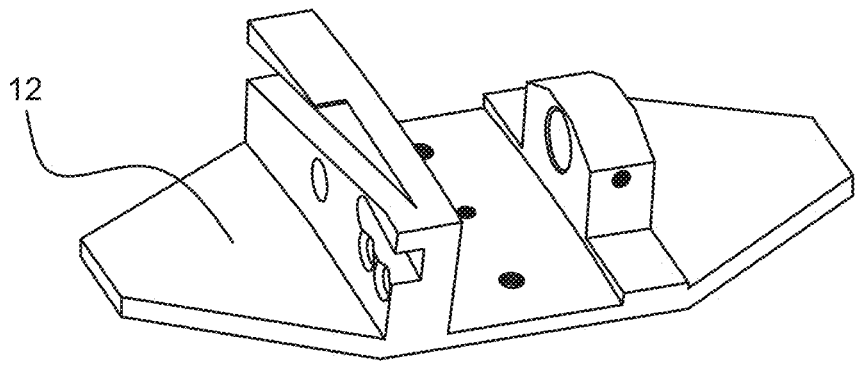

FIG. 4 illustrates additional features of the shoe 12 which provide attachment fixtures for securing the shoe 12 to a corresponding driven link 32 of a transfer ring 10. In the embodiment of FIG. 4, an outer surface 64 of the shoe 12 further includes at least one wall 66 extending outwardly from the outer surface 64 generally perpendicular thereto. In the illustrated embodiment, a pair of walls 66, 68 extend outwardly from the outer surface 64 at a parallel, spaced apart orientation to one another along a circumferential dimension of the shoe 12. The walls 66, 68 are spaced apart from one another a suitable distance to allow one end of one of the driven links 32 to be inserted therebetween. Suitable fastening means, such as for example a plurality of axially-aligned through openings 70, are provided along the walls 66, 68 and through each driven link to allow receipt therein of a pin, bolt, or other such rotatable connector, so as to allow each shoe 12 to be rotatably connected to a corresponding driven link 32. In the illustrated embodiment, an internally-threaded set screw opening 72 is provided opening perpendicular to an axial dimension of one of the through openings 70, such that upon receipt of a pin connector through the through openings 70 in the walls 66, 68 and the driven link 32, a set screw (not shown) may be received within the set screw opening 72 to secure the pin connector through the through openings 70. However, it will be understood that other suitable configurations exist which may be used to achieve a rotatable connection between each shoe 12 and a corresponding driven link 32, and such other configurations may be used without departing from the spirit and scope of the present general inventive concept.

Referring to FIGS. 1, 2, and 4, first and second grooves 74, 76 are defined along each first wall 66 of each shoe 12, with each first groove 74 having at least one open end which opens toward an adjacent shoe, and with each second groove 76 having at least one open end which opens toward an opposite adjacent shoe. The first groove 74 is adapted to receive therein a first end of a rigid guide rod (not shown) of sufficient length to span two adjacent ones of the shoes 12. Each guide rod is anchored within its respective first groove 74 by a suitable fastener, such as for example a screw, bolt, weld, adhesive, or other fastener, or by an integral connection. An opposite second end of each guide rod extends into, and is slidably received within, the second groove 76 of an adjacent shoe.

The driven links 32 are configured to rotate between the expanded position (see FIG. 2) and the collapsed position (see FIG. 1) upon appropriate rotation of the drive member 30 in relation to the skeletal cage 25. Thus, upon rotation of the driven links 32 to the expanded position, the shoes 12 are carried by the driven links 32 to an expanded configuration, wherein the interior surfaces 48 of the shoes 12 are separated from one another to increase the overall diameter of the segmented cylindrical surface 50. Conversely, upon rotation of the driven links 32 to the contracted position, the shoes 12 are carried by the driven links 32 to a contracted configuration, wherein the interior surfaces 48 of the shoes 12 are brought closer to one another to decrease the overall diameter of the segmented cylindrical surface 50. To this end, and with reference again to FIG. 4, each of the first and second grooves 74, 76 is oriented with respect to one another such that each of the guide rods slide along its respective second groove 76 to cooperatively maintain the interior surfaces 48 of the shoes 12 with respect to one another in a generally cylindrical configuration throughout the above-discussed expansion and contraction of the shoes 12 between the expanded configuration and the collapsed configuration.

It will be recognized that the above-described shoes 12 defining tapered portions of the inner surface 48 extending axially outwardly from the central portion 37 thereof allow for a transfer ring 10 which, if used in a manner that imprints the inner surface 48 of the shoe 12 onto a tire component, a substantial portion of the perimeter of the imprint extends in a direction either parallel to, or at an acute angle to, an axial dimension of the segmented cylindrical surface 50. In other words, the portions of the imprints defined by the first and second side edges 34, 36 of the inner surface 48 each extend parallel to the central axis of the tire component and the segmented cylindrical surface 50. The portions of the imprints defined by each of the tapered edges 52, 54, 56, 58 extend at acute angles to the central axis of the tire component and the segmented cylindrical surface 50. However, only the relatively shorter first and second end edges 38, 42 form portions of imprints having seams extending substantially perpendicular to the axial dimension of the segmented cylindrical surface 50, along the circumference of the tire segment. Thus, when a tire component defining one or more imprints of this shape is stitched to another tire component, the axially parallel and angled portions of the imprints defined by the side edges 34, 36 and tapered edges 52, 54, 56, 58 make it easier for air to be moved toward the axially outer edges of the tire components, and such air may be more readily expelled therefrom. At the same time, the portions of the imprints defining seams extending perpendicular to the axial dimension of the tire component, across which it may be more difficult to expel air from between the tire components, are reduced as compared to prior art transfer ring designs.

In this regard, in several embodiments, the width of the axially central portion 37 of the shoes 12, i.e., the width of the parallel first and second side edges 34, 36, may be configured so as to be less than the width of a standard stitcher roller. In the illustrated embodiment of FIGS. 1-5, the taper angle "θ" of each of the tapered edges 52, 54, 56, 58 in relation to the respective side edge 34, 36 is approximately 30 degrees inward from the side edges 34, 36 toward the circumferentially central portion 46 of the inner surface 48. However, it will be understood that other angles and/or configurations are possible without departing from the scope of the present general inventive concept.

Figure 6:
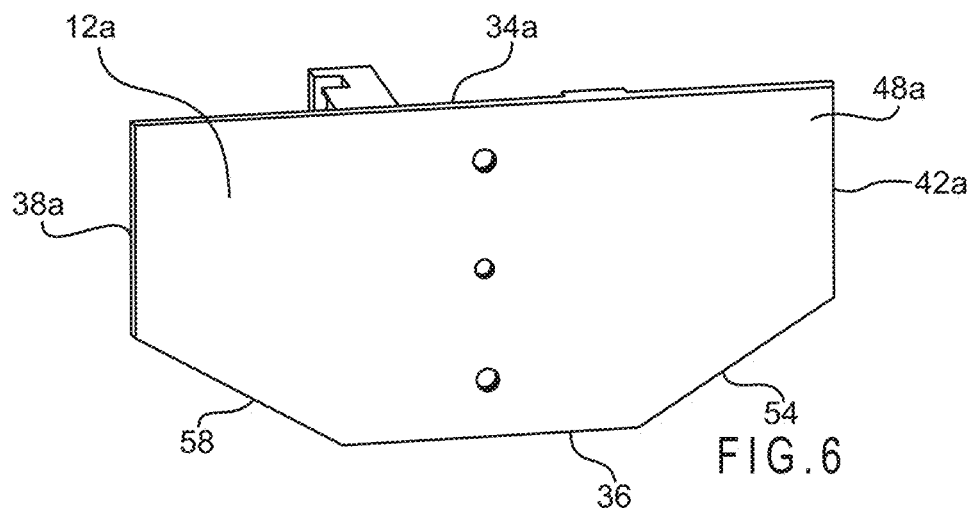
FIG. 6 illustrates a perspective view of another embodiment of a transfer ring shoe constructed in accordance with various features of the present general inventive concept.

While the shoes 12 illustrated in FIGS. 1-5 each have a generally octagonal diamond shape, it is understood that a host of other shapes and configurations can be employed without departing from the scope of the present general inventive concept. For example, FIG. 6 illustrates another embodiment of a transfer ring shoe 12a constructed in accordance with various features of the present general inventive concept. In the embodiment of FIG. 6, the shoe 12a is tapered from only one of the side edges 36 to the end edges 38a, 42a, with the remaining side edge 34a formed along the entire axial length of the inner surface 48a of the shoe 12a. In other embodiments, the side portions of the shoe may be formed so as to taper in any of various curved configurations, either convex or concave, and may be tapered or curved in the same direction circumferentially along the shoe.

Figure 7:
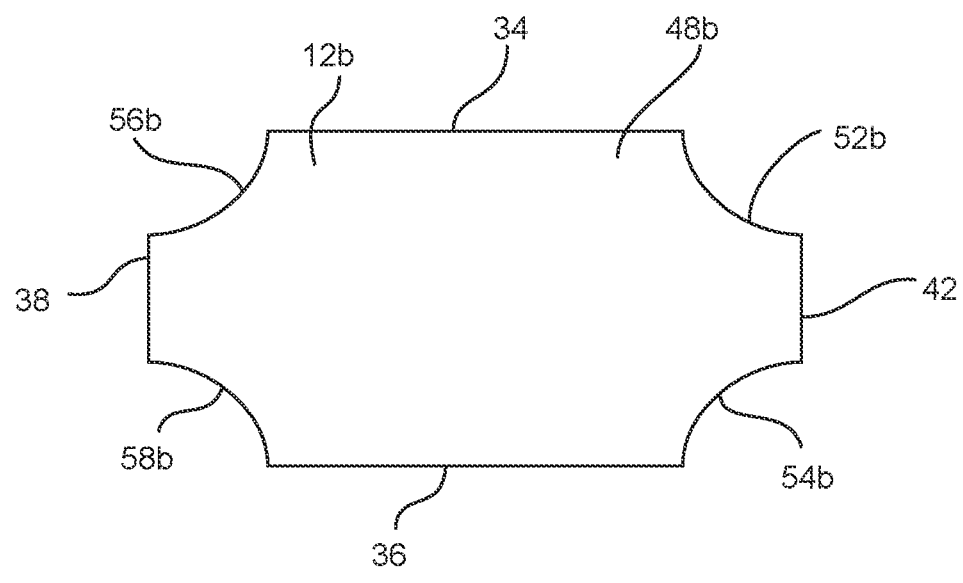
FIG. 7 illustrates a side view of another embodiment of a transfer ring shoe constructed in accordance with various features of the present general inventive concept.

As an example, FIG. 7 illustrates another embodiment of a transfer ring shoe 12b constructed in accordance with various features of the present general inventive concept. In the embodiment of FIG. 7, the shoe 12b incorporates curved tapered edges 52b, 54b, 56b, 58b, with each tapered edge defining a concave path toward the axial and circumferential central portions of the inner surface 48b. In this embodiment, the rate of taper of the axially-outward tapered portions of the inner surface 48b begins sharply, and such rate of taper decreases as the end edges 38, 42 of the shoe 12b are approached. Conversely, in other embodiments, convex tapered edges may be provided, such that the rate of taper of the axially-outward tapered portions of the inner surface begins gradually and increases as the end edges of the shoe are approached.

Regardless of the configuration of the tapering, it may be desired that the shoe be symmetrical about a point midway between the end edges of the shoe 12. While the shoe may or may not be symmetrical from first to second side edges, it may be desirable in various embodiments to be substantially symmetrical between the first and second end edges to avoid harmonic problems with the finished tire. Such harmonic issues that may otherwise be present may also be diminished, e.g., harmonic resonance may be softened, due to the reduced air entrapment provided by the shoes of the present general inventive concept. By way of example, in the embodiment of FIG. 6, while the shoe 12a is not symmetrical in a circumferential direction of the arcuate inner surface 48a of the shoe 12a, the shoe 12a is nevertheless symmetrical from end edge 38a to end edge 42a.

Various example embodiments of the present general inventive concept may provide a transfer ring for use in a system for the manufacture of vehicle tires, the transfer ring including a radially expandable and collapsible segmented generally cylindrical gripping surface defined by a plurality of inwardly-facing arcuate surfaces mounted for generally radial movement toward and away from a central axis of the cylindrical gripping surface, each arcuate surface having first and second side edges configured to be substantially parallel to one another at least at respective mid-portions thereof, wherein at least one of the first and second side edges tapers in a direction away from the respective mid-portion to form first and second side portions that decrease in width in a direction away from the respective mid-portion. Each of the first and second side edges may taper from the respective mid-portions to form the first and second side portions that decrease in width in the direction away from the respective mid-portions. The at least one of the first and second side edges may taper away from the respective mid-portion at an angle of 30 degrees. The first and second side portions may be configured to have respective first and second end edges that are substantially parallel to one another. Each of the first and second side edges may taper away from the respective mid-portions to form curved first and second side portions. The parallel mid-portion of the first and second side edges may be configured to be narrower than a stitcher width, and in some example embodiments that narrower mid-portion may itself be a radius. The arcuate surfaces may be symmetrical about a mid-point between the first and second side portions.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A transfer ring for use in a system for the manufacture of vehicle tires, the transfer ring comprising:
a radially expandable and collapsible segmented generally cylindrical gripping surface defined by a plurality of inwardly-facing surfaces mounted for movement toward and away from a central axis of the cylindrical gripping surface, each inwardly-facing surface having first and second side edges, each side edge having a central portion configured to be substantially parallel to a central portion of the other side edge and forming a mid-portion therebetween, and each side edge having first and second tapered portions on opposite respective ends of the central portion, each tapered portion of each side edge extending in a direction outward from the corresponding central portion and toward a tapered portion of the other side edge-;
wherein the first tapered portions of the first and second side edges cooperate to form a first end portion, and the second tapered portions of the first and second side edges cooperate to form a second end portion, the first and second end portions decreasing in width in a direction away from the mid-portion.

2. The transfer ring of claim 1, wherein the first and second tapered portions of each first and second side edge extend inwardly from the respective central portion at an angle of 30 degrees.

3. The transfer ring of claim 1, wherein the first and second end portions further define respective first and second end edges that are substantially parallel to one another.

4. The transfer ring of claim 1, wherein the first and second tapered portions of each first and second side edge extend inwardly from the respective central portion to form curved first and second end portions.

5. The transfer ring of claim 1, wherein the central portion of each first and second side edge is narrower than one of the respective first and second tapered portions.

6. The transfer ring of claim 1, wherein the inwardly-facing surfaces are symmetrical about a mid-point between the first and second end portions.

7. The transfer ring of claim 1, wherein each inwardly-facing surface defines an arcuate shape about a circumferential dimension of the cylindrical gripping surface.

8. The transfer ring of claim 1, wherein each inwardly-facing surface defines an arcuate shape about an axial dimension of the cylindrical gripping surface.

9. The transfer ring of claim 1, wherein each central portion of each first side edge of each inwardly-facing surface is shaped to conform to and engage a central portion of a second side edge of an adjacent inwardly-facing surface at a collapsed position of the transfer ring.

10. The transfer ring of claim 1, wherein each first and second end edge is narrower than each central portion of each first and second side edge.

11. A transfer ring shoe for use in a system for the manufacture of vehicle tires, the transfer ring shoe comprising:
a plate defining a first surface for gripping a tire component and an opposite second surface; and
a mount for securing the plate for movement toward and away from a central axis of a transfer ring;
wherein the first surface defines:
opposite first and second side edges extending parallel to one another;
opposite first and second end edges extending parallel to one another; and
a plurality of tapered edges, each tapered edge extending inwardly from, and between corresponding ends of, ones of the first and second side edges and the first and second end edges;
whereby a mid-portion of the plate between the first and second side edges defines a gripping surface for a tire component, and whereby each end edge and corresponding adjacent tapered edges cooperate to define a tapered end portion of the plate configured to form an air escape seam in a gripped tire component.

12. The transfer ring shoe of claim 11, wherein each tapered edge extends at an angle of 30 degrees F.rom a corresponding side edge.

13. The transfer ring shoe of claim 11, wherein each tapered edge extends inwardly from a respective side edge to form curved first and second end portions.

14. The transfer ring shoe of claim 11, wherein each side edge is narrower than each tapered edge.

15. The transfer ring shoe of claim 11, wherein the plate is symmetrical about a mid-point between the first and second end edges.

16. The transfer ring shoe of claim 11, wherein the first surface defines an arcuate shape between the first and second side edges.

17. The transfer ring shoe of claim 11, wherein the first surface defines an arcuate shape between the first and second end edges.

18. The transfer ring shoe of claim 11, wherein the first side edge is shaped to conform to the second side edge of an adjacent shoe.

19. The transfer ring shoe of claim 11, the mount defining a portion of a hinge connection for rotatably connecting the transfer ring shoe to a driven link.

20. The transfer ring shoe of claim 11, the mount defining a portion of a cam for maintaining the first surface of the transfer ring shoe in a cylindrical configuration with an adjacent transfer ring shoes.

* * * * *